US006994312B2

(12) United States Patent
Pauer et al.

(10) Patent No.: US 6,994,312 B2
(45) Date of Patent: Feb. 7, 2006

(54) DEVICE FOR ADJUSTING THE ARMATURE STROKE OF A SOLENOID VALVE

(75) Inventors: Thomas Pauer, Freiberg (DE); Tilman Miehle, Waiblingen (DE); Hrvoje Lalic, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/507,738

(22) PCT Filed: Jun. 26, 2003

(86) PCT No.: PCT/DE03/02128

§ 371 (c)(1),
(2), (4) Date: Sep. 15, 2004

(87) PCT Pub. No.: WO2004/040126

PCT Pub. Date: May 13, 2004

(65) Prior Publication Data

US 2005/0127316 A1 Jun. 16, 2005

(30) Foreign Application Priority Data

Oct. 22, 2002 (DE) ................................ 102 49 161

(51) Int. Cl.
*F16K 31/06* (2006.01)

(52) U.S. Cl. ................................ 251/129.18; 251/285

(58) Field of Classification Search ........... 251/129.18, 251/285

See application file for complete search history.

(56) References Cited

U.S. PATENT DOCUMENTS 1,822,668 A * 9/1931 Protzeller ................... 251/285
2,587,538 A * 2/1952 Seaman ................. 251/129.18
2,697,581 A * 12/1954 Ray ........................... 251/285
2,828,937 A * 4/1958 Kreitchman ........... 251/129.18
3,373,943 A 3/1968 Roosa
3,429,552 A * 2/1969 Erickson et al. ....... 251/129.18
3,633,869 A * 1/1972 Lehmann ............... 251/129.18
3,876,177 A * 4/1975 Putschky .............. 251/129.18
4,092,001 A 5/1978 Hofmann
4,630,799 A * 12/1986 Nolan et al. ........... 251/129.18
4,978,074 A 12/1990 Weinand
5,044,563 A * 9/1991 Mesenich ............. 251/129.18
5,169,066 A 12/1992 Ricco et al.

(Continued)

FOREIGN PATENT DOCUMENTS

DE 38 03 505 A1 8/1988

(Continued)

*Primary Examiner*—John Bastianelli
(74) *Attorney, Agent, or Firm*—Ronald E. Greigg

(57) ABSTRACT

A device for adjusting an armature stroke of an armature upon actuation of a magnet of an electromagnetic valve having a stop bush disposed in an axial guide relative to a main body of the electromagnetic valve and adjustable in its axial position relative to the main body of the electromagnetic valve, which stop bush forms a stop for limiting the armature stroke in an axial direction. A variable adjusting element with two threaded portions providing a variable thread pitch (P) and the same thread direction by which the position of the stop bush is adjustable. The first threaded portion engages a corresponding first threaded portion of the stop bush, and the second threaded portion engages a corresponding second threaded portion of the main body, and to an electromagnetic valve having a corresponding device, in particular for use in a fuel injector.

19 Claims, 4 Drawing Sheets

U.S. PATENT DOCUMENTS

| | | | | | |
|---|---|---|---|---|---|
| 5,277,399 | A | * | 1/1994 | McCabe ................ | 251/129.18 |
| 5,586,747 | A | * | 12/1996 | Bennardo et al. ...... | 251/129.18 |
| 5,842,679 | A | * | 12/1998 | Kolchinsky ............ | 251/129.18 |
| 6,079,435 | A | * | 6/2000 | Franz et al. ........... | 251/129.18 |
| 6,339,366 | B1 | | 1/2002 | Meisiek | |

FOREIGN PATENT DOCUMENTS

| | | | |
|---|---|---|---|
| EP | 0 404 336 | A1 | 12/1990 |
| EP | 0 483 769 | A1 | 5/1992 |
| GB | 769006 | | 2/1957 |
| GB | 2 149 453 | A | 6/1985 |

* cited by examiner

DEVICE FOR ADJUSTING THE ARMATURE STROKE OF A SOLENOID VALVE

CROSS-REFERENCE TO RELATED APPLICATIONS

This application is a 35 USC 371 application of PCT/DE 03/02128 filed on Jun. 26, 2003.

BACKGROUND OF THE INVENTION

1. Field of the Invention

For supplying fuel to combustion chambers of internal combustion engines, injection systems for injecting fuel are used whose injectors are exposed to extremely high pressures. In order not to impair the efficiency of such fuel injectors, it is absolutely necessary to assure replicable injector performance. Suitable injectors as a rule have an electromagnetic valve, and an armature stroke of such an electromagnetic valve must be adjusted precisely when applicable injectors are being installed, since the injector dynamics are definitively affected by the armature stroke. For instance, given a fixed triggering duration of a magnet coil of the electromagnetic valve, the injected fuel quantity is dependent on the armature stroke.

2. Description of the Prior Art

In currently known electromagnetic valves used in conjunction with injectors in injection systems for fuel supply purposes, the armature stroke is adjusted via adjusting rings, which fix the axial position of a corresponding armature stop. Via the armature, or the motion of the armature in the axial direction and its axial (terminal) position, the opening of a nozzle of the injector and thus the injected fuel quantity are defined. When an electromagnetic valve or an injector is assembled, the components that determine the armature stroke are measured, and on the basis of the measurement results, the dimensions, required for a certain predetermined armature stroke, of a adjusting ring are attained. A magnet group, together with the adjusting ring dimensioned in accordance with the calculation, is then screwed to the injector body, and then the armature stroke is measured in the screwed-together or in other words tightened state. For use in extremely high-pressure injection system injectors, however, acceptable tolerances for the armature stroke are in the micrometer range, if replicable injector performance is to be assured. Because of the only slight deviations in tolerances allowed, after an initial installation as described above the armature stroke does not always remain within the tolerance values. To assure the adjusting of the armature stroke within the close tolerance values then, the magnet group must be completely removed, and the armature stroke must be reset by way of the choice of an adjusting ring of a different size. Possibly this operation may even have to be repeated more than once, until acceptable adherence to tolerances of the armature stroke can be attained. This process leads to high costs in production.

In view of the stringent requirements for accuracy in adjusting the armature stroke of electromagnetic valves, especially for used in conjunction with injectors in injection systems for injecting fuel into combustion chambers of internal combustion engines, it is desirable and necessary to assure the accuracy of the adjustment of the armature stroke without additional installation requirements.

The present invention has the object in particular of furnishing a device for adjusting an armature stroke of an armature of an electromagnetic valve, in particular for use in conjunction with injectors in injection systems, by which even after an initial installation, because it is possible to adjust the armature stroke, dismantling again if the armature stroke is adjusted incorrectly is unnecessary, and as a result the production costs can be reduced. An improved tolerance position of the armature stroke moreover makes a more-precise output of a fuel quantity from a suitably equipped injector.

SUMMARY OF THE INVENTION

The embodiment according to the invention of a device for adjusting an armature stroke of an electromagnetic valve advantageously enables adjusting of the armature stroke even from outside after an initial installation, and as a result, if an armature stroke is outside the tolerance values, there is no need for an incorrectly adjusted electromagnetic valve to be dismantled. According to the invention, it is possible for an armature stroke, which follows actuation of a magnet of the electromagnetic valve, to be adjusted via a variable adjusting element which has two threaded portions of differing thread pitch (P) and which is still attainable and adjustable even after the electromagnetic valve and/or an entire injector which has the electromagnetic valve has been assembled. The thread direction of the two threaded portions is the same. By way of the adjustment of the adjusting element, the position of a stop bush which is disposed in an axial guide is adjustable and the stop bush is adjustable in its axial position with respect to a main body of the electromagnetic valve. As a result of its axial position as adjusted, the stop bush forms a stop for the armature to limit the armature stroke in an axial direction of the electromagnetic valve. The adjustment in the axial position of the stop bush relative to the main body of the electromagnetic valve via the adjusting element is effected in such a way that a first threaded portion of the adjusting element engages a corresponding first threaded portion of the stop bush with the same thread pitch, and that a second threaded portion of the adjusting element engages a corresponding second threaded portion of the main body with the same thread pitch. The respective thread pitches of the respective first and second threaded portions differ; that is, the thread pitch of the respective first threaded portions is for instance less than the thread pitch of the respective second threaded portions. Effectively, upon appropriate adjustment of the adjusting element, the result is an axial adjustment of the position of the stop bush relative to the main body, and this is the result of the difference between the two different thread pitches. It should be noted that the respective threaded portions of the adjusting element may have female or male threads, which then engage corresponding male- or female-threaded portions in the stop bush or the main body. As long as all the corresponding threads each have the same thread direction, in principle any combination of female- and male-threaded portions is possible. Also, the first threaded portion of the stop bush may be cut directly into the stop bush, but it is also possible for a special element of the stop bush optionally to have the corresponding first threaded portion of the stop bush. The same is true for the second threaded portion of the main body; there as well it is possible for the second threaded portion to be cut directly into the main body, but it is also possible for the second threaded portion of the main body to be disposed in an element especially intended for it that is part of the main body. The two threaded portions of the adjusting element may also be cut directly into the adjusting element, but it is also possible to provide additional special elements of the adjusting element here that each have the respective threaded portions. In general, such special elements may for instance be cuffs, bushes, or the like.

In an advantageous feature of the invention, the magnet or magnet assembly, which may comprise an electromagnet assembly with coils, may be disposed essentially around the stop bush, but it is also possible for the magnet or corresponding magnet assembly to be disposed essentially in the stop bush. "Essentially" should be understood here to mean that the magnet does not entirely surround the corresponding stop bush, or that the corresponding magnet is not entirely surrounded by the stop bush. By this kind of disposition of the magnets and stop bush, on the one hand especially good accessibility to the stop bush exists, depending on given conditions, and on the other, a space-saving design of the device or electromagnetic valve of the invention that suits the most various installation conditions can be attained, which in turn can lead to savings of material and thus to a reduction in production costs.

The axial guide of the stop bush, in preferred embodiments of the invention, may be disposed in the magnet, but it is also possible for the axial guide of the stop bush to be disposed in the main body. Depending on the given installation situation, efficient and reliable axial guidance of the stop bush is possible, which serves the purpose of accuracy and reliability of the adjustment of the armature stroke.

In a preferred embodiment of the invention, the axial guide may be formed by at least one recess, in which a corresponding protrusion of the stop bush is guided. This recess may, as described above, be disposed either in the magnet or in the main body. It is also possible for the corresponding recess to be embodied in additional special elements, such as cuffs, bushes or the like, of either the magnet or the main body. Preferably, at least two recesses and corresponding protrusions are provided; however, it is also possible for only one recess and a corresponding protrusion, or three or more recesses each with corresponding protrusions, to be provided. The recess or recesses extend in the axial direction at least as far as is required for the adjustability of the armature stroke. Specifically when the device of the invention is used in electromagnetic valves in injectors in high-pressure injection systems, especially secure axial guidance of the stop bush, making reliable adjustment of the armature stroke possible, is attainable because of the preferred design according to the invention.

In a further preferred embodiment, the axial guide may also be formed by at least one flattened region, on which a correspondingly flattened region of the stop bush is guided. Once again, a plurality of such regions may be embodied, but preferably two such regions are embodied. The flattened region or regions extend in the axial direction at least as far as the adjustability of the armature stroke requires. It is also possible for the flattened regions to be embodied in additional special elements, such as cuffs, bushes or the like, of either the magnet or the main body. This further preferred design according to the invention of the axial guide permits an optionally somewhat simpler design of the region of the axial guide, and as a result production costs can be reduced still further.

In electromagnetic valves, it is moreover necessary for the so-called remanent air gap, that is, the spacing between the armature and the magnet or magnet assembly, also to be adjusted upon actuation of the electromagnetic valve. According to the invention, this can advantageously be accomplished by providing a remanent air gap adjusting disk which by its thickness determines the remanent air gap between the magnet or magnet assembly and the armature, when the armature rests on the stop bush and reaches its corresponding terminal stroke position. For example, the remanent air gap adjusting disk may be disposed in a region between a corresponding receptacle on the stop bush and the magnet. Advantageously, a defined value for the size of the remanent air gap can thus already be predetermined upon initial installation.

An embodiment of the present invention in which the stop bush is formed by a magnet bush itself is especially preferred. The stop bush embodied as a magnet bush then surrounds the magnet or magnet assembly completely, making it possible to reduce the number of components, since the corresponding magnet bush simultaneously acts as a stop bush as well.

The same advantage of cost reduction for a simultaneously use-specific component design is offered by a preferred embodiment of the present invention in which the adjusting element is formed by a magnet clamping nut, which screws a magnet bush, which may for instance also be embodied as a stop bush, to the main body, which for example may also be formed by an injector body directly.

To enable an especially fine adjustment of the armature stroke, the value of the difference between the various pitches of the two threaded portions is preferably in a range from 0.02 to 0.10, and especially preferably at a value of 0.05. In other words, the thread pitch of the respective first threaded portions, for instance, is $P_1$=0.70 mm, and the thread pitch of the respective second threaded portions is $P_2$=0.75 mm. The difference between the thread pitches is 0.05. Over a complete 360° rotation of the adjusting element, the axial position of the stop bush thus changes relative to the main body by 0.05 mm.

The electromagnetic valve of the invention having the characteristics of claim 10, which is intended in particular for use in a fuel injector, has a magnet or magnet assembly and an armature, and also has a device for adjusting an armature stroke of the armature upon actuation of the magnet, having a stop bush is disposed relative to a main body of the electromagnetic valve or of the injector in an axial guide and is adjustable in its axial position relative to the main body, wherein this stop bush forms a stop for limiting the armature stroke in an axial direction, and wherein the device for adjusting the armature stroke has an variable adjusting element with two threaded portions of different thread pitch (P) and the same thread direction, by which element the position of the stop bush is adjustable, and the first threaded portion engages a corresponding first threaded portion of the stop bush, and the second threaded portion engages a corresponding second threaded portion of the main body. Because of the adjustability—even retroactively—of the axial position of the stop bush by a suitable adjusting element, economical production of a corresponding electromagnetic valve is possible, and in particular in the use of an electromagnetic valve of this kind, because of the resultant possibility of close-tolerance armature stroke adjustment, replicable injector performance is assured.

BRIEF DESCRIPTION OF THE DRAWINGS

The invention is described in further detail below in conjunction with the drawings, in which.

Shown are.

DESCRIPTION OF THE PREFERRED EMBODIMENTS

Figure 1A:
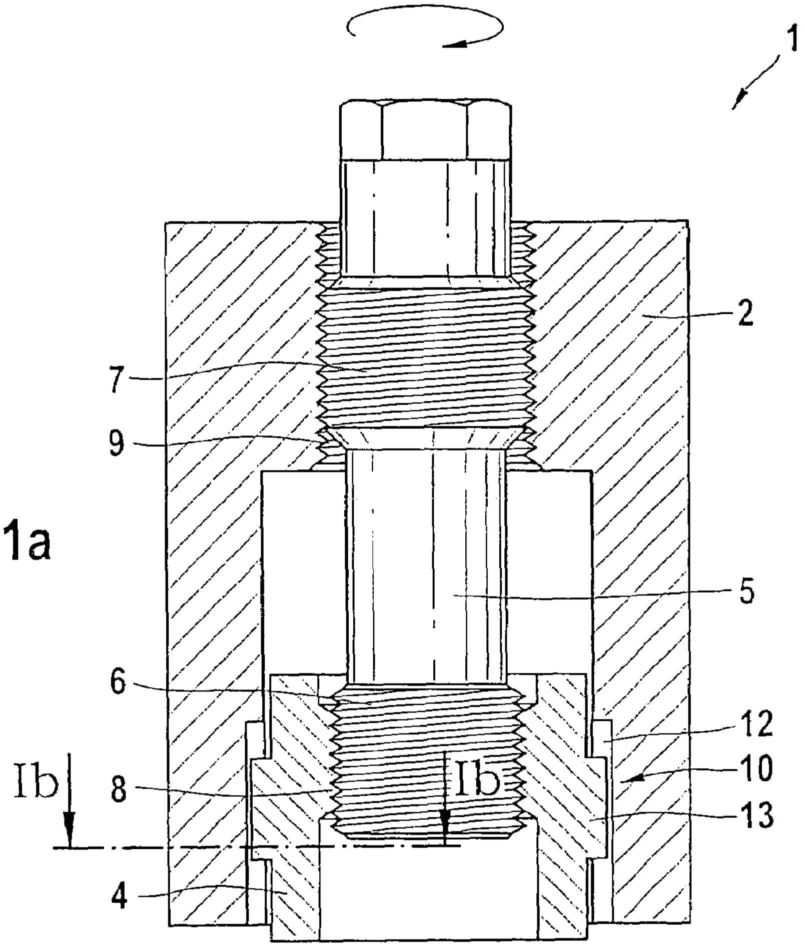
FIG. 1*a* is a schematic illustration of an adjusting device that explains the fundamental principle of the present invention.

FIG. 1, in a fragmentary sectional view, is a schematic illustration of the device according to the invention for adjusting an armature stroke of an armature of an electromagnetic valve.

In a main body 2, which is part of an electromagnetic valve 1, a stop bush 4 is disposed in such a way that by means of an axial guide 10 it is guided movably in the main body 2. The axial guide 10 is formed by two recesses 12 in the main body 2 and two corresponding protrusions 13 of the stop bush 4 which are received in these recesses. The stop bush 4, in an inner region thereof, has a first threaded portion 8 which is designed as a female thread. The main body 2, in its upper portion, has a second threaded portion 9 which is embodied as a female thread. An adjusting element 5 is disposed in both the main body 2 and stop bush 4 and rotatably engages these elements with a first threaded portion 6 and a second threaded portion 7, respectively, in the respective first threaded portion 8 of the stop bush 4 and the second threaded portion 9 of the main body 2 and meshes with each of these as applicable. The various threaded portions have different pitches; the first threaded portions 6, 8 in this example have a pitch of $P_1$=0.70mm, for instance, and the second threaded portions 7, 9 each have a thread pitch of $P_2$=0.75 mm. If as represented by the arrow in FIG. 1*a* the adjusting element 5 is now rotated counter to the fixed main body 2 and counter to the stop bush 4, which is prevented via the axial guide from rotating counter to the fixed main body 2, the result is an axial displacement of the stop bush 4 relative to the main body 2. In the example selected, the axial displacement of the stop bush 4 relative to the main body 2 upon one rotation of the adjusting element 5 would be $P_2-P_1=0.75-0.70=0.05$, or in other words 0.05 mm of axial displacement. The stop bush 4 acting as a stop for limiting the armature stroke of an armature (not shown) would thus vary the armature stroke by 0.05 mm upon one rotation of the adjusting element 5. The precise adjustment of the armature stroke can be effected via the variable adjusting element 5 even after assembly has been done.

Figure 1B:
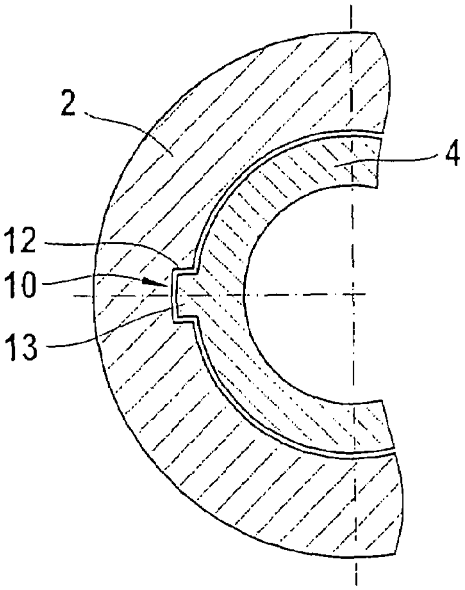
FIG. 1*b* is a sectional view of the schematic illustration of FIG. 1*a* taken along the line lb.

FIG. 1*b* shows a fragmentary sectional view of the axial guide 10 of the stop bush 4 in the main body 2, taken along the section line lb of FIG. 1*a*.

The stop bush 4 is secured against rotating relative to the main body 2 by the axial guide 10. In the embodiment of FIGS. 1*a* and 1*b*, this effected by providing that the axial guide 10 is formed by two recesses 12 in the main body 2, in each of which recesses a corresponding protrusion 13 of the stop bush 4 is guided.

Figure 2:
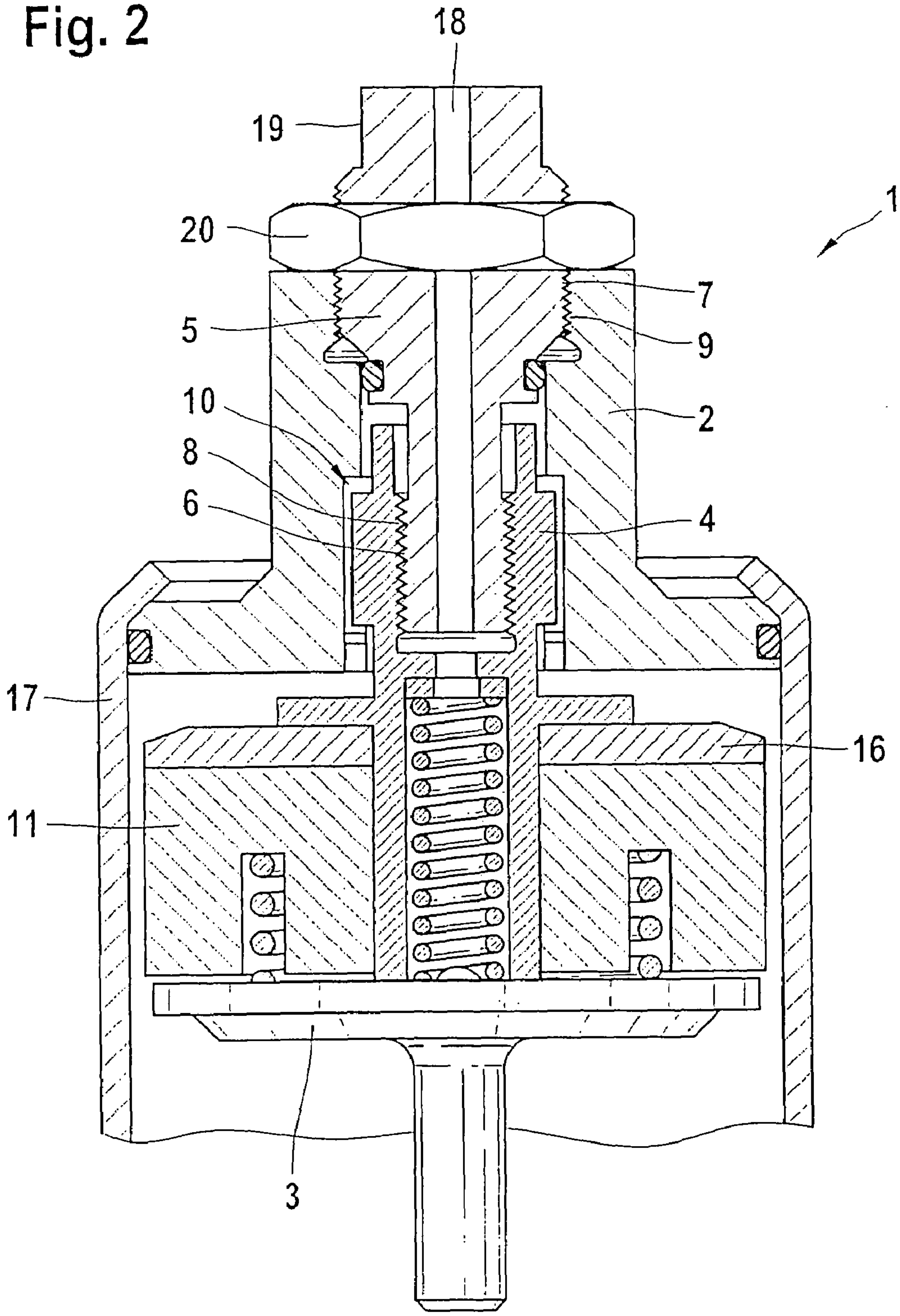
FIG. 2 is a first preferred embodiment of an electromagnetic valve having a device according to the invention for adjusting an armature stroke.

FIG. 2 shows a first preferred embodiment of the device for adjusting an armature stroke, as it is used in an electromagnetic valve 1.

A stop bush 4 is disposed axially movably in an axial guide 10 in the main body 2 of the electromagnetic valve 1; in its embodiment, the axial guide 10 is essentially equivalent to the disposition of an axial guide 10 shown in FIGS. 1*a* and 1*b*. An adjusting element 5 is introduced from below into the main body 2 and the stop bush 4, and respective first threaded portions 6 and 8 in a region of the stop bush 4 and second threaded portions 7 and 9 in a region of the main body 2 respectively engage one another. By rotation of the adjusting element 5 at an adjusting portion 19, it is thus possible, via the first and second threaded portions, which have different pitches but the same thread course direction, to make an axial change in the position of the stop bush 4 in the main body 2; as soon as the correct position has been established, the corresponding position of the adjusting element 5 can be fixed via a lock nut 20. A magnet 11, designed as an electromagnet, of the electromagnetic valve 1 is disposed around the stop bush 4, in a lower region of this stop bush 4. Via a magnet bush 17 of the electromagnetic valve 1, the magnet 11 is sealed off from the environment. Between the magnet 11 and a stop, provided appropriately for it, of the stop bush 4, there is a remanent air gap adjusting disk 16, in the embodiment of FIG. 2, which upon actuation of the electromagnetic valve 1 (this situation is shown in FIG. 2) defines the thickness of the remanent air gap between the corresponding underside of the magnet 11 and the top side of the armature 3. Upon actuation of the electromagnetic valve, the armature is pulled upward far enough that is limited in its stroke by striking against the corresponding stop of the stop bush 4. However, at that time it does not yet rest on the magnet 11, which is disposed around the corresponding stop region of the stop bush 4; instead, there is still a remanent air gap remaining between the magnet 11 and the armature 3, whose size is adjustable via the thickness of the remanent air gap adjusting disk 16, or in other words via the axial position of the magnet relative to the stop of the stop bush. It is possible, via an oil outlet bore 18, to measure the oil throughput, which is characteristic for the magnitude of the armature stroke, and then optionally to adjust the armature stroke via a rotation of the adjusting element 5 by corresponding axial displacement of the stop bush 4. By means of an armature spring (not shown here), all the moving parts of the adjusting mechanism are prestressed; in the case in which the magnet 11, which in the embodiment shown is designed as an electromagnet, is subjected to current, or in other words pulls the armature upward with a certain force, all the moving parts of the adjusting mechanism are prestressed upward, since otherwise they would be incited to vibrate counter to the rotation of the armature 3. This prestressing and the components for it are not shown in FIG. 2. By way of example, the prestressing could be brought to bear by a suitably disposed wave spring washer below a core of the magnet; the force of the spring prestressing should be much greater than the force of the magnet.

In the exemplary embodiment of FIG. 2, the magnet 11 moves along with the stop bush 4 in the event of a change in the axial position of the stop bush, so that upon a suitable adjustment of the armature stroke, the remanent air gap remains unchanged.

Figure 3A:
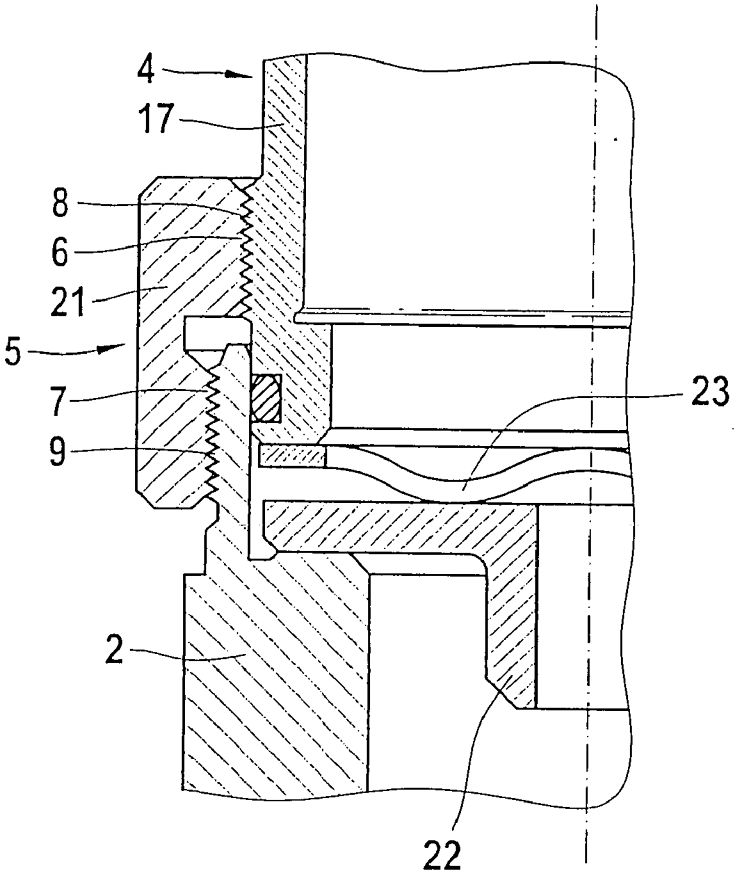
FIG. 3*a* is a fragmentary section through a second preferred embodiment of an electromagnetic valve, with adjustment of an armature stroke in accordance with the present invention.

FIG. 3*a* shows a second preferred embodiment of the device for adjusting an armature stroke of an electromagnetic valve; here, the stop bush 4 is formed by the magnet bush 17, which is completely surrounded by the magnet 11 (the magnet itself is located inside the magnet bush 17 and is not shown), and the adjusting element 5 is embodied as a magnet clamping nut 21, which with its first threaded portion 6, embodied as a female thread, engages the first threaded portion 8, correspondingly embodied as a male thread, of the stop bush 4 and, with its second threaded portion 7, embodied as a female thread, engages the corresponding second threaded portion 9, embodied as a male thread, of the main body 2. The main body 2 directly forms the actual injector body. The armature (not shown) is guided in an armature guide 22. Rotating the magnet clamping nut 21 embodied as an adjusting element 5 brings about an adjustment in the axial position of the magnet bush 17, embodied as a stop bush 4, relative to the main body 2 embodied as an injector body. The magnet travels the same axial distance, together with the magnet bush 17. To assure the installation of the device for adjusting the armature stroke in accordance with the embodiment shown in FIG. 3*a*, the region above the first threaded portion 8 of the magnet bush 17 must afford sufficient space, or in other words it must have approximately the same height as the total threaded portion. The magnet clamping nut 21, for installation, is rotated in advance to beyond the first threaded portion 8 of the magnet bush 17; the magnet is pressed into the magnet bush 17; and then the magnet clamping nut 21 is also screwed to the main body 2. The stop bush 4 or magnet bush 17 that forms the stop bush 4 must be sufficiently deformable, or else an elastic component must be built in, in this case in FIG. 3*a* a wave spring washer 23, so that this washer can be deformed or prestressed upon suitable adjustment of the armature stroke. Once the armature stroke has been adjusted, the magnet clamping nut 21 is secured against coming loose by a lock nut (not shown).

Figure 3B:
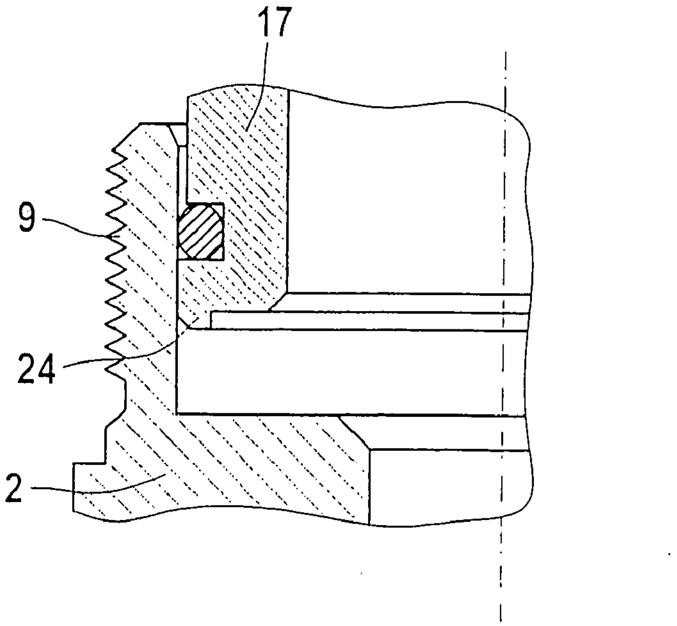
FIG. 3*b* is a detail of a further variant of the embodiment of the present invention shown in FIG. 3*a;*

FIG. 3*b* shows a deformation portion 24 of the magnet bush 17, designed as a stop bush 4, of the kind otherwise shown in the same way in FIG. 3*a*. Upon adjustment of the armature stroke, the deformation portion 24 can be deformed appropriately as needed, as a result of which the armature stroke is defined.

Figure 4A:
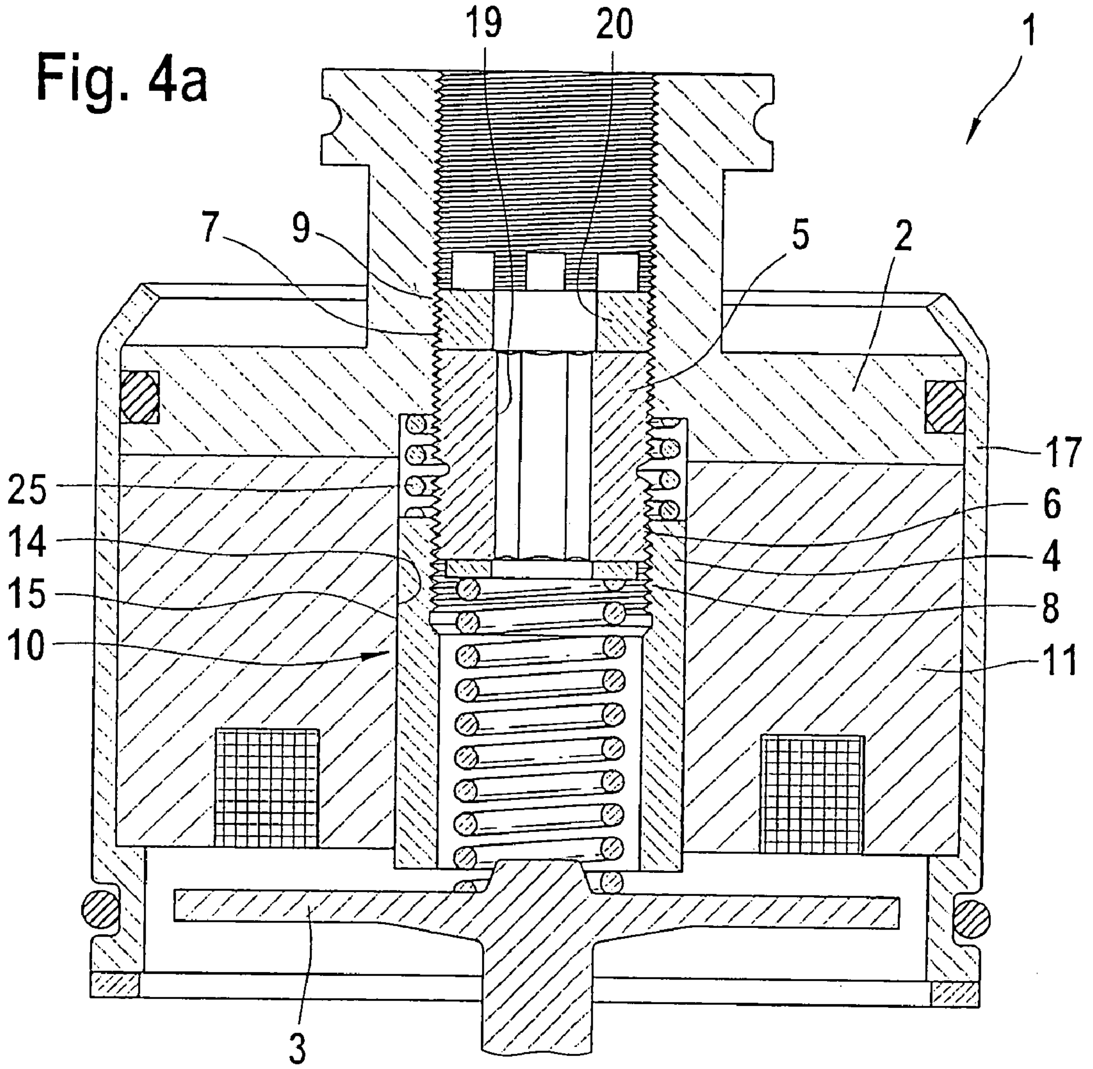
FIG. 4*a* is an electromagnetic valve having a device for adjusting an armature stroke in a further preferred embodiment of the present invention.

FIG. 4*a* shows an embodiment of a device for adjusting the armature stroke of an electromagnetic valve 1 of the kind used particularly in common rail injectors, in which markedly greater tolerances for the values of the size of the remanent air gap are acceptable than is the case for the values for the armature stroke. Thus if a device for adjusting an armature stroke is used in electromagnetic valves of common rail injectors, an adjustment of the remanent air gap value is tolerable once a fine adjustment of the armature stroke has been made. This makes a simplified embodiment of the device of the invention for adjusting an armature stroke possible, compared to the embodiment of FIG. 2*a*. In this simpler embodiment, the stop bush 4 has at least one flattened region 15 as its axial guide 10, and this flattened region is guided on a corresponding flattened region 14. In the case of the embodiment of FIG. 4*a*, the flattened region 14 is embodied on the magnet 11, which is fixed against rotation relative to the main body 2, but in principle it would also be possible for this flattened region 14 to be provided directly on the main body 2, for instance. In the exemplary embodiment of FIG. 4*a*, two flattened regions 14 and two corresponding flattened region 15 of the stop bush 4 are provided.

The magnet 11 is surrounded by a magnet bush 17, which seals it off from the environment. For assembly of a corresponding electromagnetic valve 1, the adjusting element 5 is screwed into the stop bush 4, and then the unit thus formed is introduced into the surrounding magnet 11; the adjustment in the height of the region of the stop bush 4 that protrudes past the bottom plane of the magnet 11, which height in the inserted state defines the remanent air gap, is effected by means of suitably extensive screwing in of the first threaded portion 6 of the adjusting element 5 into the first threaded portion 8 of the stop bush 4. A certain reserve value is taken into account here. The adjusting element 5 is screwed into the main body 2, or into the region of the outlet neck of this main body 2, by means of the adjusting portion 19 of the adjusting element 5, which portion is designed as a hexagonal socket. Because of the different thread pitch, it is then possible, as already known, to make an adjustment in the axial position of the stop bush 4 relative to the main body 2, and as a result, since the magnet 11 and the stop bush 4 in this embodiment are axially displaceable counter to one another, a corresponding fine adjustment of the remanent air gap is simultaneously possible. The armature stroke itself can then be adjusted in the known way via a suitable adjusting portion. This adjusting portion is not shown here in FIG. 4*a*. Once the entire installation of the electromagnetic valve of the invention has thus been completed, a fine adjustment of the armature stroke can then be made from above, via the adjusting portion 19, embodied as a hexagonal socket, of the adjusting element 5, but in this process, because of the axial displaceability of the magnet 11 and stop bush, the size of the remanent air gap also varies. However, because of the aforementioned greater tolerance values for the remanent air gap, this is acceptable. The exact adjustment of the armature stroke can finally be fixed with the lock nut 20. By means of a spring 25 with a suitably high spring rate, the thread play in the stop bush 4 is overpressed. By a suitable design of the spring rate of the spring 25, damping of the activation recoil upon actuation of the electromagnetic valve 1 can be accomplished, and as a result the performance graph curve data of the common rail injector equipped with such an electromagnetic valve 1 can be varied.

Figure 4B:
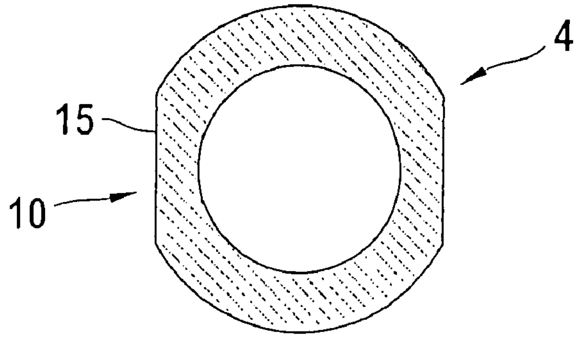
FIG. 4*b* is a cross-sectional view of a stop bush of the embodiment of the invention shown in FIG. 4*a*.

FIG. 4*b* in detail shows a plan view of the design of the stop bush 4 in the embodiment of FIG. 4*a*, in the region of the axial guide 10; in particular, the two flattened regions 15 that are present in the exemplary embodiment can be seen.

The foregoing relates to preferred exemplary embodiments of the invention, it being understood that other variants and embodiments thereof are possible within the spirit and scope of the invention, the latter being defined by the appended claims.

LIST OF REFERENCE NUMERALS

1 Electromagnetic valve
2 Main body
3 Armature
4 Stop bush
5 Adjusting element
6 First threaded portion
7 Second threaded portion
8 First threaded portion of the stop bush
9 Second threaded portion of the main body
10 Axial guide
11 Magnet
12 Recess
13 Protrusion

14 Flattened region
15 Flattened region of the stop bush
16 Remanent air gap adjusting disk
17 Magnet bush
18 Oil outlet bore
19 Adjusting portion
20 Lock nut
21 Magnet clamping nut
22 Armature guide
23 Wave washer
24 Deformation portion
25 Spring
P Thread pitch
$P_1$ Thread pitch of the first threaded portions
$P_2$ Thread pitch of the second threaded portions

What is claimed is:

1. A device for adjusting an armature stroke of an armature (3) upon actuation of a magnet (11) of an electromagnetic valve (1), the device comprising a stop bush (4) disposed in an axial guide (10) relative to a main body (2) of the electromagnetic valve (1) and being adjustable in its axial position relative to the main body (2) of the electromagnetic valve, the stop bush forming a stop for limiting the armature stroke in an axial direction, a variable adjusting element (5) for adjusting the position of the stop bush (2), the adjusting element (5) having two threaded portions (6, 7) providing a variable thread pitch (P) and the same thread direction, and a first threaded portion (8) on the stop bush (4) and a second threaded portion (9) on the main body (2), the first threaded portion (6) engaging and corresponding to the first threaded portion (8), and the second threaded portion (7) engaging and corresponding to the second threaded portion (9).

2. The device of claim 1, wherein the magnet (11) of the electromagnetic valve (1) is disposed essentially around the stop bush (4).

3. The device of claim 1, wherein the magnet (11) of the electromagnetic valve (1) is disposed essentially in the stop bush (4).

4. The device of claim 1, wherein the axial guide (10) is disposed in the magnet (11).

5. The device of claim 2, wherein the axial guide (10) is disposed in the magnet (11).

6. The device of claim 3, wherein the axial guide (10) is disposed in the magnet (11).

7. The device of claim 1, wherein the axial guide (10) is disposed in the main body (2).

8. The device of claim 2, wherein the axial guide (10) is disposed in the main body (2).

9. The device of claim 3, wherein the axial guide (10) is disposed in the main body (2).

10. The device of claim 1, wherein the axial guide (10) is formed by at least one recess (12), in which a corresponding protrusion (13) of the stop bush (4) is guided.

11. The device of claim 2, wherein the axial guide (10) is formed by at least one recess (12), in which a corresponding protrusion (13) of the stop bush (4) is guided.

12. The device of claim 3, wherein the axial guide (10) is formed by at least one recess (12), in which a corresponding protrusion (13) of the stop bush (4) is guided.

13. The device of claim 1, wherein the axial guide (10) is formed by at least one flattened region (14), on which a correspondingly flattened region (15) of the stop bush (4) is guided.

14. The device of claim 2, wherein the axial guide (10) is formed by at least one flattened region (14), on which a correspondingly flattened region (15) of the stop bush (4) is guided.

15. The device of claim 1, further comprising a remanent air gap adjusting disk (16), which by its thickness determines the remanent air gap between the magnet (11) and the armature (4).

16. The device of claim 3, wherein the stop bush (4) a magnet bush (17).

17. The device of claim 3, wherein the adjusting element (5) is a magnet clamping nut (21).

18. The device of claim 1, wherein the difference between the pitches (P) of the two threaded portions (6, 7) is in the range from 0.02 to 0.10, and preferably is at a value of 0.05.

19. An electromagnetic valve (1) for use in a fuel injector, which has a magnet (11) and an armature (3), further having an adjusting for adjusting an armature stroke of the armature (3) upon actuation of a magnet (11) of an electromagnetic valve (1), the adjusting device comprising a stop bush (4), disposed in an axial guide (10) relative to a main body (2) of the electromagnetic valve (1) and adjustable in its axial position relative to the main body (2) of the electromagnetic valve, which stop bush forms a stop for limiting the armature stroke in an axial direction, wherein an variable adjusting element (5) with two threaded portions (6, 7), a variable thread pitch (P) and the same thread direction on the adjusting element (5) by which the position of the stop bush (4) is adjustable; and wherein the first threaded portion (6) engages a corresponding first threaded portion (8) of the stop bush (4), and the second threaded portion (7) engages a corresponding second threaded portion (9) of the main body (2).

* * * * *